United States Patent

[11] 3,628,119

| [72] | Inventor | Dennis G. Abraham<br>Vestal, N.Y. |
|---|---|---|
| [21] | Appl. No. | 30,754 |
| [22] | Filed | Apr. 22, 1970 |
| [45] | Patented | Dec. 14, 1971 |
| [73] | Assignee | International Business Machines Corporation<br>Armonk, N.Y. |

[54] TWO-SPEED BI-DIRECTIONAL, CLOSED LOOP STEPPER MOTOR CONTROL CIRCUIT
5 Claims, 3 Drawing Figs.

[52] U.S. Cl. .................................................... 318/685,
318/601, 318/603
[51] Int. Cl. .................................................... G05b 19/40
[50] Field of Search ........................................... 318/685,
696, 138, 254, 601, 603

[56] References Cited
UNITED STATES PATENTS

| 3,378,741 | 4/1968 | Sutton | 318/685 |
|---|---|---|---|
| 3,435,310 | 3/1969 | Bradley | 318/365 X |
| 3,435,314 | 3/1969 | Bradley et al. | 318/685 X |
| 3,443,181 | 5/1969 | Kozol et al. | 318/138 |
| 3,458,786 | 7/1969 | Thompson | 318/138 X |
| 3,476,996 | 11/1969 | Fredriksen | 318/696 |
| 3,482,155 | 12/1969 | Fredriksen | 318/685 |
| 3,523,230 | 8/1970 | York | 318/685 X |

Primary Examiner—G. R. Simmons
Attorneys—Hanifin and Jancin and Paul M. Brannen

ABSTRACT: Two-speed bidirectional, closed loop stepping motor control is obtained, utilizing only a single feedback encoding device. The feedback signals are combined logically with suitable input controls and suitable acceleration and deceleration pulse sources, to provide the type of operation required. The system operation comprises acceleration to low speed, acceleration to high speed, change from low speed to high speed, change from high speed to low speed, and a stopping sequence from any speed. The stop signal may occur at random with no loss of motor control.

INVENTOR
DENNIS G. ABRAHAM

TWO-SPEED BI-DIRECTIONAL, CLOSED LOOP STEPPER MOTOR CONTROL CIRCUIT

FIELD OF THE INVENTION

This invention relates generally to stepping motor control systems, and in particular to a stepping motor control system utilizing a single feedback encoding device to provide feedback pulses to enable a system to operate in closed loop fashion and by suitably combining the feedback pulses with appropriate signals for governing direction and speed, together with means for generating stopping signal sequences, to thereby obtain two-speed bidirectional, closed loop operation.

DESCRIPTION OF THE PRIOR ART

In previous stepping motor control systems arranged for bidirectional operation, such systems could run at only one speed when a single feedback encoder was employed. In order to run at a higher speed multiple encoder readouts were required. In such previous multispeed systems the motor speed is altered by switching the feedback between encoding pickup heads spaced at different lead angles. Accordingly, they are by nature unidirectional or if made bidirectional, then they require double the number of encoder readouts.

SUMMARY OF THE INVENTION

It is a principal object of the present invention to provide an improved control system for stepping motors arranged for two-speed bidirectional, closed loop operation, utilizing a minimum number of expensive components.

A more particular object of the present invention is to provide an arrangement of logic circuitry for combining directional and speed control signals with feedback signals provided from a single feedback encoder in a stepping motor control system.

Still another object of the present invention is to provide the two-speed bidirectional, closed loop stepping motor control system in which changes in speed between high and low speeds can be made at any point except during deceleration.

Still another object of the present invention is to provide a control system for stepping motors, in which a stopping signal to stop the operation of the motor may occur at random with no loss of motor control.

Other objects of the invention and features of novelty and advantages thereof will become apparent from the detailed description to follow, taken in connection with the accompanying drawings.

In practicing the invention, the stepping motor drive circuits are provided with a conventional bidirectional counter for sequentially energizing the windings of the motor in predetermined sequences to secure the appropriate direction of rotation. Feedback serially pulses generated on a single feedback line as a result of a feedback encoder mechanically connected to the motor shaft provide pulses to a plurality of logic circuits which are arranged so that under specific combinations of speed and directional controls, or under a specific stop command, the feedback pulses are combined with separately generated pulses to vary the sequence and timing of the stepping motor drive pulses. By providing such logical controls of the feedback and the separately supplied pulses, the need for plural feedback pulse generators is eliminated.

GENERAL DESCRIPTION OF THE DRAWINGS

In the drawings.

Similar reference characters refer to similar parts in each of several views.

DESCRIPTION OF THE PREFERRED EMBODIMENT

Figure 1:
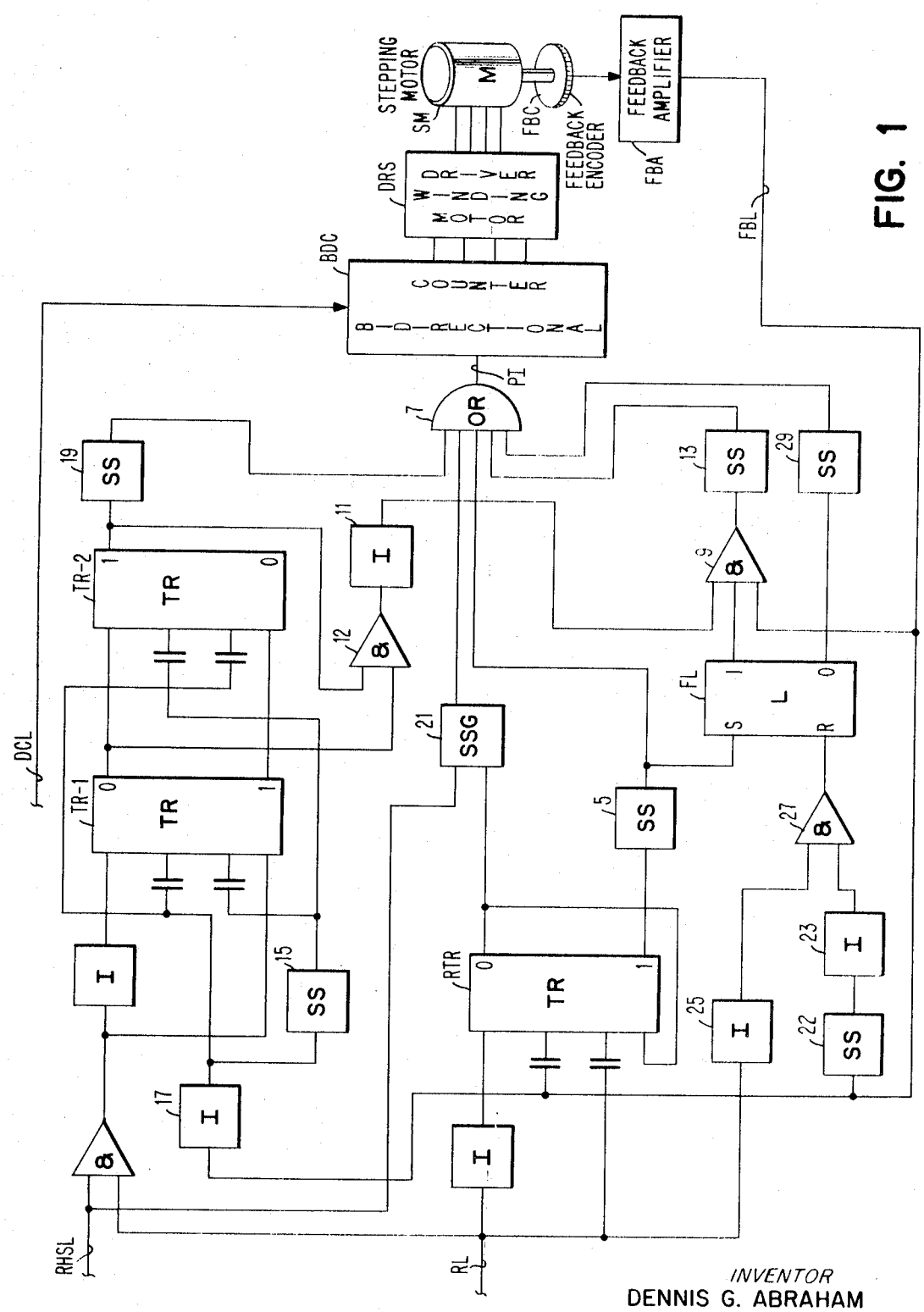
FIG. 1 is a diagrammatic illustration of a stepping motor control system comprising a preferred embodiment of the present invention, arranged to provide two-speed and bidirectional operation of the stepping motor.

Referring now to FIG. 1 of the drawings, there is shown in schematic form a stepping motor control circuit comprising the preferred embodiment of the invention. As may be found in known stepping motor control circuits, the system includes a plurality of driver circuits DRS, arranged to supply pulses of energy of sufficient magnitude and proper phase relationship to the windings of a conventional stepping motor SM, under the control of the outputs of a bidirectional counter BDC. the bidirectional counter BDC has a direction control line DCL, which determines the direction in which the count sequence shall occur on the output signal lines to the driver, and also includes a pulse input line PI, which determines the occurrence of the outputs. The stepper motor SM, of the conventional type, drives a suitable utilization shaft, not shown, to which is attached a single output feedback encoder FBC, which may be of any suitable type, such as a photoelectric variety, which supplies serial feedback pulses to a single line designated as FBL by way of a conventional feedback amplifier FBA.

All of the foregoing apparatus and arrangement is conventional and well known in the art and is deemed unnecessary to describe the apparatus in any further detail for this particular portion of the circuitry.

The remainder of the apparatus comprises a plurality of bistable devices such as triggers and latches, together with timing or delay circuits such as conventional single shots, and a special pulse sequence generator designated by the reference SSG, the purpose and operation of which will be subsequently It is believed that the description of the arrangement shown in FIG. 1 will be enhanced by describing its operation under various operating conditions.

The first operating condition which will be described is that of starting the system and accelerating it to a first or low-speed condition.

Operation is initiated by the provision of a signal on a control line designated RL, for run line. The command signal appearing on this line is supplied to the run trigger RTR, setting that trigger on, the output of which fires a start single shot 5. The output from the single shot is supplied via the OR-circuit 7, and the line PI to the bidirectional counter BDC. This pulse advances a conventional set of triggers or latches which are provided in the bidirectional counter BDC, which are not shown for the sake of simplifying the drawings. The change of the bidirectional counter BDC displaces the field of a stepping motor via the outputs of the motor winding driver DRS, and thus forces the rotor of the stepping motor SM to move to a new position in accordance with the displaced condition of the field. The feedback encoder FBC supplies, via the amplifier FBA, suitable serial feedback pulses on the single feedback signal line FBL in accordance with the motion of the motor shaft.

When single shot 5 fired, it set latch FL, the ON condition of this latch providing one input to an AND-circuit 9, another input which is supplied from an inverter 11, so that the feedback pulses on line FBL, which form a third input to the AND-circuit 9, are supplied therethrough to another single shot 13, which in turn sends pulses to the OR-circuit 7 to thereby operate the motor driving circuitry. At this time, therefore, the motor will accelerate until it reaches its saturation speed. Thereafter, the motor will operate at its first or low-speed condition.

It will now be assumed that it is desired to accelerate the stepping motor and the system which it drives to a second or higher speed. This acceleration will take place from a stopped condition. The sequence of operation in this instance differs from the sequence previously described for acceleration to the low speed only by the fact that a single extra pulse is fed to the bidirectional counter after the second feedback pulse. If high-speed operation is desired, the run high-speed line RHSL is turned on. This allows a trigger TR-1 to be set on by the output from a single shot 15, governed by an inverter 17, which is in turn supplied from the feedback line FBL. The single shot signal indicating the absence of the feedback pulse sets TR-1 on by the negative edge of the first feedback pulse and allows a second trigger TR-2 to be set on the second negative edge of the signals on the line FBL. TR-2 being set fires an advance single shot 19, which supplies an extra pulse to the bidirectional counter via the OR-circuit 7. The effect of this extra advance pulse at this time is to advance the field of the stepping motor to an advanced position which has the same effect as changing the mechanical lead angle of the feedback encoder FBC by one motor step. Under these circumstances, the stepping motor will accelerate to the second or higher speed condition. The extra pulse need not be injected after the second FB edge but may occur at any point that is consistent with system parameters.

The next type of operation to be considered is a change from the low-speed to high-speed operation. This sequence is the same as the sequence involved in accelerating to a high speed except that the motor is already in motion. The change may be accomplished at any random point in time by energization of the run high-speed line RHSL. The advance winding pulse is fed to the bidirectional counter between the second and third feedback drive pulse after the speed change has been commanded. This extra pulse could be injected immediately at the time of the next FB pulse but use of the same control circuits as are used for initial high-speed acceleration simplifies the logic.

The next operation to be considered is a change from a high speed to a low speed. In order to make this change it is necessary to return the operating field of the stepping motor to its normal position. This is done by skipping one drive pulse supplied by the feedback encoder. When the low-speed high-speed line RHSL changes from a high-speed condition to a low-speed condition, TR-1 is a reset by the next negative feedback pulse edge as a result of the signal supplied via the inverter 17. With TR-1 reset and TR-2 still set, the combination provides an input to an AND-circuit 12, the combination an input to an AND-circuit 12, the output of which via inverter 11 blocks the AND-circuit 9 and hence blocks the next feedback pulse on line FBL from access to the OR-circuit 7, and hence the counters and driving circuits of the motor. The next negative feedback pulse appearing on FBL resets TR-2. This disables AND 12 and through inverter 11 allows FB signals through AND 9 to fire single shot 13 and advance the counter through OR 7. The effect of skipping this pulse in the sequence returns the field to its normal position, and as a result, the motor goes down to its slower speed and continues to operate at this speed. An identical effect could be obtained by rapidly inserting three pulses. This is more fully described in a copending application, Ser. No. 888,704.

The next operation to be described is the stopping sequence for bringing the motor to a stop from any speed.

In order to stop the motor it is necessary to bring the motor field into a position where it lags the rotor in order to generate a negative torque. When the run line RL drops, the next pulse on the line FBL resets the run trigger RTR. The run trigger going to its off condition provides a signal to the stopping sequence generator 21 which feeds, in quick succession, the necessary number of pulses to the drive pulse OR circuit 7, to cause the motor fields to rapidly advance to a position in which they are actually providing the required field lag. The number of pulses which the stopping sequence generator 21 provides is determined by whether or not the system is operating at high or low speed as determined by the RHSL line. For low speed, for example, three pulses will be generated, whereas for high speed only two pulses are generated. A holdover single shot 22 is governed by the pulses on line FBL and is arranged so that it monitors the time between the feedback pulses as the system decelerates under closed loop control. When the time between the pulses drops below a predetermined value, this single shot times out and its output, suitably inverted by inverter 23 and with an inverter signal from line RL via the inverter 25 are combined in an AND-circuit 27 which resets the latch FL. When latch FL resets, a single shot 29 is fired and is timed in conjunction with single shot 21 so as to deliver one last pulse to the bidirectional counter BDC so that any extra perturbations in the system are damped out with the result that the system is brought to a smooth stop.

Figure 2:
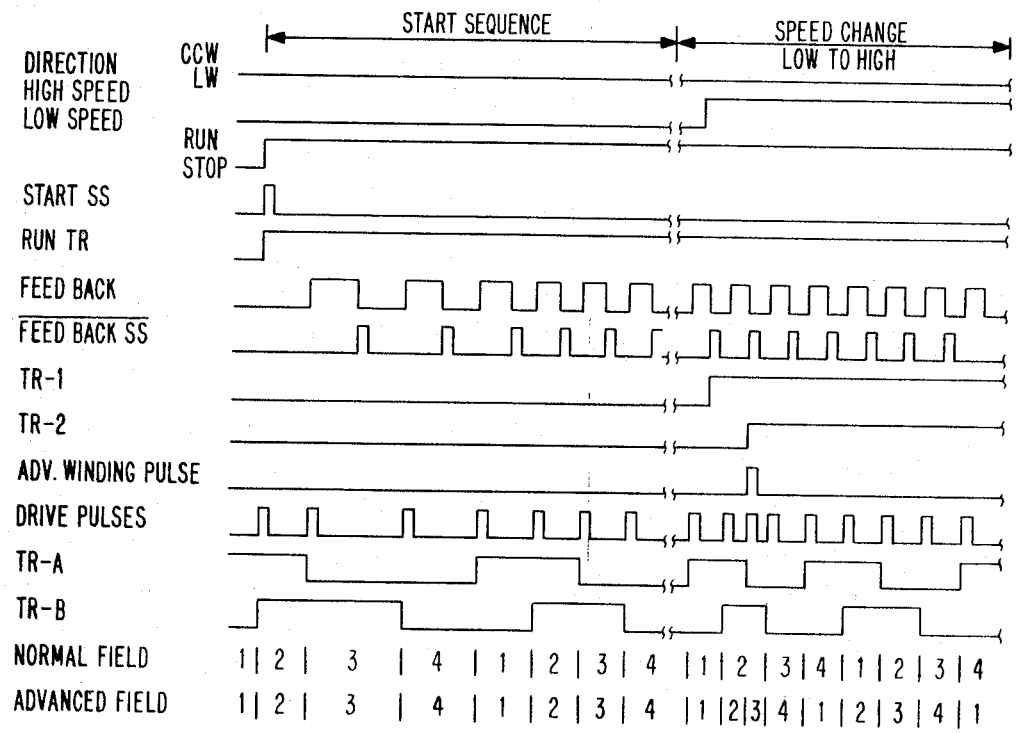
FIG. 2 is a diagrammatic waveform illustration showing the pulse sequences involved in starting the stepping motor and in connection with a speed change from low to high speed.
Figure 3:
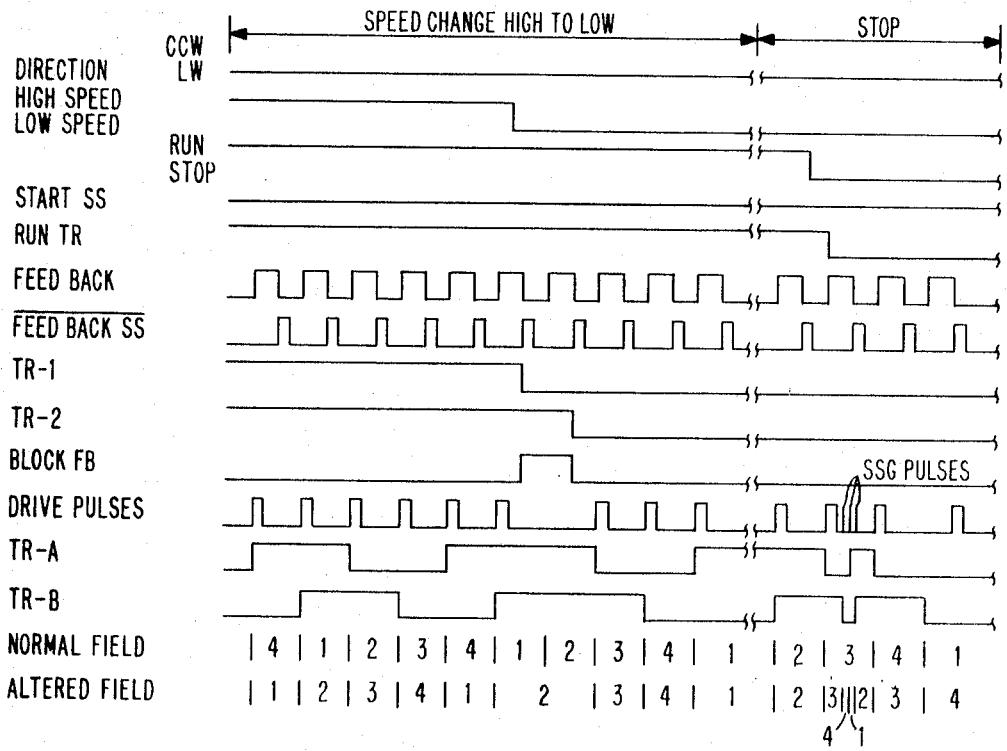
FIG. 3 is a diagrammatic waveform illustration showing the pulse forms encountered during a speed change from high to low speed and then during a stopping sequence.

The operation of the system under various conditions is illustrated in FIGS. 2 and 3, the different sequences being indicated at the top of each of the set of waveforms. The pulses which occur at various points in the system are illustrated, as well as the sequence of signals supplied to the stepping motor field which are indicated by the numbered sequences at the bottom of FIGS. 2 and 3. It is believed that these figures are self-explanatory when considered in connection with the previous description and an examination of the diagram of FIG. 1, and hence no detailed explanation of the waveforms in FIGS. 2 and 3 is considered necessary.

From the foregoing, it will be apparent that the present invention provides an improved stepping motor control system which requires only one source of serial feedback pulses, which, combined with externally generated pulses by suitable logic circuitry permits the stepping motor system to be operated at different speeds as well as in different directions without the necessity of a plurality of separate encoders.

While the invention has been particularly shown and described with reference to a preferred embodiment thereof, it will be understood by those skilled in the art that changes in form and details may be made therein without departing from the spirit and scope of the invention.

What is claimed is:

1. A stepping motor control system for controlling a stepping motor in both directions and at different speeds, comprising, in combination, a stepping motor of the type having a plurality of windings, the direction and speed of rotation of the motor being dependent upon the sequence and frequency of pulses supplied to the motor, a single feedback encoder driven by said motor for supplying serial feedback pulses on a single feedback signal line in accordance with the speed of rotation of said motor, bidirectional counter means connected to said motor for providing motor control output pulses in predetermined sequence for sequentially energizing the windings of said stepping motor, direction control means connected to said counter means for selectively reversing the sequence of said counter means to thereby selectively reverse the direction of rotation of said motor, starting means for starting said motor including run trigger means turned on by a run command signal for supplying a starting sequence signal to said bidirectional counter means, run control means governed by said starting means for supplying said serial feedback pulses from said encoder and said single feedback signal line to said bidirectional counter to thereby enable continuing operation of said motor, high-speed control means governed by a high-speed control signal and effective when rendered operative to supply an additional pulse to said bidirectional counter, for advancing the field of the stepping motor to an advanced position, effective to cause the motor to accelerate to a high-speed operation, and decelerating control means connected to said counter and governed by said high speed control means and effective when the high speed control signal is terminated for retarding the field of said stepping motor by causing said counter to skip a control pulse.

2. A stepping motor control system as claimed in claim 1, in which said run control means includes bistable means governed by said run trigger means and effective when set on by said run trigger means to supply said serial feedback pulses to said counter and to block said serial feedback pulses when setoff.

3. A stepping motor control system as claimed in claim 1, in which said decelerating control means includes bistable means governed by said high-speed control signal and effective when in a predetermined state to inhibit the supply of said serial feedback pulses from said feedback encoder to said bidirectional counter.

4. A stepping motor control system as claimed in claim 3, in which said bistable means comprises a pair of triggers having a selected combination of outputs an further including logic circuit means governed by said trigger outputs for controlling the supply of said serial feedback pulses to said counter.

5. A stepping motor control system as claimed in claim 4, in which the setting of said triggers is governed in part by said serial feedback pulses.

* * * * *